(12) United States Patent
Kato et al.

(10) Patent No.: US 7,089,836 B2
(45) Date of Patent: Aug. 15, 2006

(54) HALE-MACHINING METHOD AND APPARATUS

(75) Inventors: Tomohisa Kato, Anjo (JP); Katsuhiko Takeuchi, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 99 days.

(21) Appl. No.: 10/772,372

(22) Filed: Feb. 6, 2004

(65) Prior Publication Data

US 2004/0187654 A1    Sep. 30, 2004

(30) Foreign Application Priority Data

Mar. 27, 2003    (JP)    ............... 2003-086959

(51) Int. Cl.
*B23E 1/00*    (2006.01)
*B23E 21/00*    (2006.01)

(52) U.S. Cl. ............... 82/1.11; 82/121; 82/158
(58) Field of Classification Search ............... 82/1.11, 82/121, 120, 137, 139, 159; B23E 1/00
See application file for complete search history.

(56) References Cited

U.S. PATENT DOCUMENTS

| | | | | |
|---|---|---|---|---|
| 3,680,263 A | * | 8/1972 | Johnson ............... 451/23 |
| 4,375,739 A | | 3/1983 | Machida et al. |
| 4,461,121 A | * | 7/1984 | Motzer et al. ............... 451/5 |
| 4,752,160 A | | 6/1988 | Murray et al. |
| 4,833,764 A | * | 5/1989 | Muller ............... 29/40 |
| 5,195,407 A | | 3/1993 | Takeno et al. |
| 5,197,228 A | * | 3/1993 | Sharkey et al. ............... 451/5 |
| 5,323,572 A | * | 6/1994 | Guenin ............... 451/21 |
| 5,630,747 A | * | 5/1997 | Haller ............... 451/11 |
| 6,039,634 A | * | 3/2000 | Bach et al. ............... 451/49 |
| 2004/0134318 A1 | * | 7/2004 | Inada et al. ............... 82/149 |

OTHER PUBLICATIONS

Paten Abstract of Japan, JP 2002-103192, Apr. 9, 2002.

* cited by examiner

*Primary Examiner*—Monica Carter
*Assistant Examiner*—Sara Addisu
(74) *Attorney, Agent, or Firm*—Oblon, Spivak, McClelland, Maier & Neustadt, P.C.

(57) ABSTRACT

It is one object of a hale-machining method and apparatus thereof according to the present invention to achieve an easy preparation of an NC machining program and perform a high geometrical accuracy in the predetermined three-dimensional free curved surface.

A haling tool 34 is set on a tool holder 32 in such a manner that a cutting point P of the haling tool 34 is substantially coincided with an intersection of a first rotating axis B, a second rotating axis A and a third rotating axis C. A rotary table 16 and a rotary base 24 are rotated in such a manner that a tool axis direction of said haling tool is substantially coincided with a normal direction of said machined surface. A tool holder 32 is rotated in such a manner that a front rake surface of the haling tool 34 is substantially directed in perpendicular to a feeding direction of said haling tool 34. A workpiece table holding a workpiece and the tool holder are relatively moved along a machined surface of said workpiece in three perpendicular axes including an axis parallel to said first rotating axis.

6 Claims, 3 Drawing Sheets

HALE-MACHINING METHOD AND APPARATUS

INCORPORATION BY REFERENCE

The present application claims priority under 35 U.S.C. §119 to Japanese Patent Application No. 2003-086959, filed on Mar. 27, 2003. The content of that application is incorporated herein by reference in their entirety.

BACKGROUND OF THE INVENTION

1. Field of the Invention

The present invention relates to a hale-machining method and an apparatus thereof for machining a workpiece by way of hauling or haling a tool on a surface of the workpiece, especially machining the workpiece by the tool in an attitude control in which a direction of a tool axis is substantially coincided with a normal direction of the machined surface of the workpiece and a front rake surface of the tool is substantially directed at a perpendicular angle to a feeding direction of the tool. This machining is called as the hale-machining hereinafter.

2. Description of the Related Art

It is well known for a high precision machining to machine a workpiece having three-dimension free curved surface, for example in "High Precision Free Form Surface Machine, Model AHN05 NanoProcessor" Tetsuro Shibukawa et. al., Toyoda Koki Technical Review, Vol. 43 No. 2 Page 61–65, published by TOYODA KOKI KABUSHIKI KAISHA Oct. 25, 2002. This NanoProcessor machine is described in the U.S. patent application Ser. No. 10/684,547 and in the European Patent Application No. 03 023 392.8. In this well known machine, a B-axis rotary table is mounted rotatably around a B-axis parallel to a Y-axis on a Y-axis slide table slidably mounted on a bed along the Y-axis. A tool is mounted on a tool base fixed on the B-axis rotary table. A workpiece table is slidably mounted on the bed along an X-axis and Z-axis directions each of which is perpendicular to the Y-axis. A workpiece spindle holding a workpiece is mounted on the workpiece table rotatably around C'-axis parallel to the Z-axis. Thereby, a tool axis direction of a tool is coincided with a substantial normal direction of a machined surface by rotating the rotary table and the spindle around the B-axis and C'-axis. In addition thereto, the workpiece table and the tool base are straightly moved along the X-axis, Y-axis and Z-axis directions relatively to machine a machined surface of the workpiece to a desired three dimensional free curved surface in high accuracy.

Recently, it becomes for a lens to be complex in a function and a shape, and there appears a lot of lens and die for the lens machined by hale-machining. As shown in FIG. 1, a tool axis direction L of a haling tool 34 is coincided with a normal direction N of machined surface WS of a workpiece and a front rake surface 34c of the haling tool 34 is substantially maintained in perpendicular to a feed direction F of hale-machining. Therefore, the attitude of the haling tool 34 is swung up and down by maintaining the tool axis to the normal direction and right and left by maintaining the front rake surface at the perpendicular angle to the cutting feed direction so that a removable amount is precisely maintained in constant. On the result, the machined surface of the workpiece W can be machined by haling tool 34 to achieve a high geometrical accuracy in the pre-determined three-dimensional free curved surface. However, the well-known high precision machine is not provided with mechanical means to swing or rotate right and left the workpiece or the haling tool around an A-axis parallel to the X-axis, therefore, the well-known precision machine can not hale-machine the machined surface of the workpiece in three-dimensional curved surface because the front rake surface of the haling tool can not be substantially maintained at the perpendicular angle to the cutting feed direction F at any time.

Although the well-known precision machine can hale-machine a two-dimensional surface of the workpiece by the haling tool, however, since the cutting point is far from a center of the C'-axis in cutting a peripheral portion on the workpiece, it is needed to provide an interpolation control in the C'-axis, the X-axis and the Y-axis so that it makes the controller complex. And also, the swing of the workpiece around the C'-axis is achieved by the workpiece spindle which performs another job of a continuous rotation, an error or deviation based on the continuous rotation affects the swing movement to deteriorate an accuracy in especially hale-machining the workpiece far from a center of the C'-axis.

SUMMARY OF THE INVENTION

In view of the previously mentioned circumstances, it is an object of the present Invention to provide a hale-machining method and apparatus thereof achieving an easy preparation of a NC machining program and performing a high geometrical accuracy in the predetermined three-dimensional free curved surface.

It is second object of the present invention to provide a hale-machining method and apparatus thereof performing a high geometrical accuracy by adjusting a cutting point finely.

It is third object of the present invention to provide a hale-machining apparatus performing a high geometrical accuracy by a simple construction and a high rigidity.

It is fourth object of the present invention to provide a hale-machining apparatus performing a high geometrical accuracy by rotating a workpiece continuously or indexably in order to simplify a NC machining program.

In order to achieve the above and other objects, the present invention provides a hale-machining method and apparatus thereof mainly controlling in such a manner that a tool axis direction of a haling tool is substantially coincided with a normal direction of a machined surface of a workpiece and in such a manner that a front rake surface of the haling tool is substantially directed in perpendicular to a feeding direction of the haling tool so that a cutting point of the haling tool contacting with the workpiece is maintained in constant and the machined surface of the workpiece is hale-machined into a good quality and a high accuracy in the desired three-dimensional free curved surface by the haling tool. And the present invention provides the hale-machining method and apparatus thereof mainly also controlling in such a manner that the cutting point of said haling tool is substantially coincided with an intersection of a first rotating axis, a second rotating axis and a third rotating axis so that it is not needed a complex calculation compensating an interference movement of the haling tool in other rotating axes based on one movement of the haling tool around one rotating axis to achieve an extremely easy preparation of the NC machining program.

Second aspect of the present invention is that the hale-machining method and apparatus thereof provides a fine position adjustment mechanism to adjust the haling tool on a tool holder in such a manner that the cutting point of the haling tool is adjusted precisely to be substantially coincided with the intersection of the first rotating axis, the second rotating axis and the third rotating axis so that the cutting point of the haling tool is accurately set just on the intersection to perform a high geometrical accuracy.

Third aspect of the present invention is that the hale-machining apparatus provides a Y-axis straight movement device moving straightly a Y-axis slide table on a bed along a Y-axis direction and a X-axis and a Z-axis straight movement devices moving straightly a workpiece table on the bed along a X-axis direction and a Z-axis direction so that it can perform a high geometrical accuracy by a simple construction and a high rigidity.

Fourth aspect of the present invention is that the hale-machining apparatus having a workpiece spindle mounted rotatably around a fourth rotating axis perpendicular to the first rotating axis so that the workpiece is continuously rotated in order to achieve a high geometrical accuracy in the three-dimensional free curved surface or each machined surface of the workpiece is indexed to a indexing position to be machined to the same three-dimensional free curved surface by the same NC machining program.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
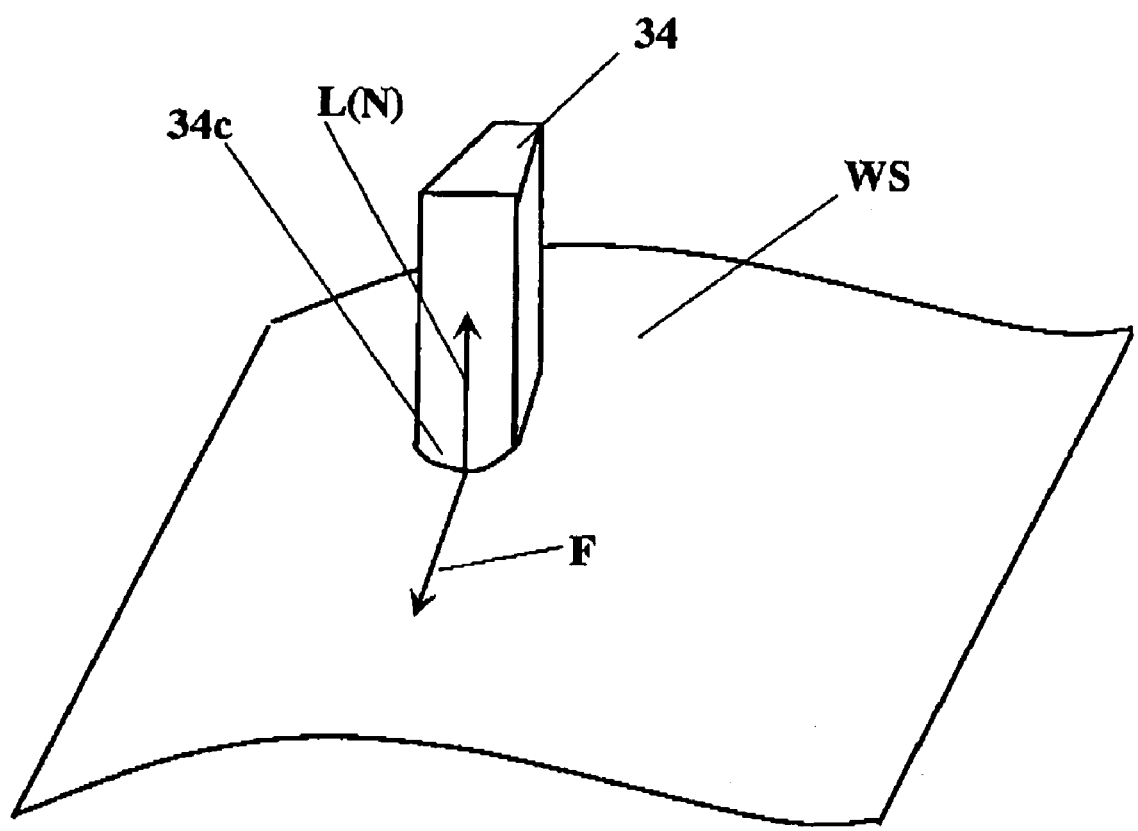
FIG. 1 is a schematic diagram of the hale-machining on the surface of the machined workpiece.
Figure 2:
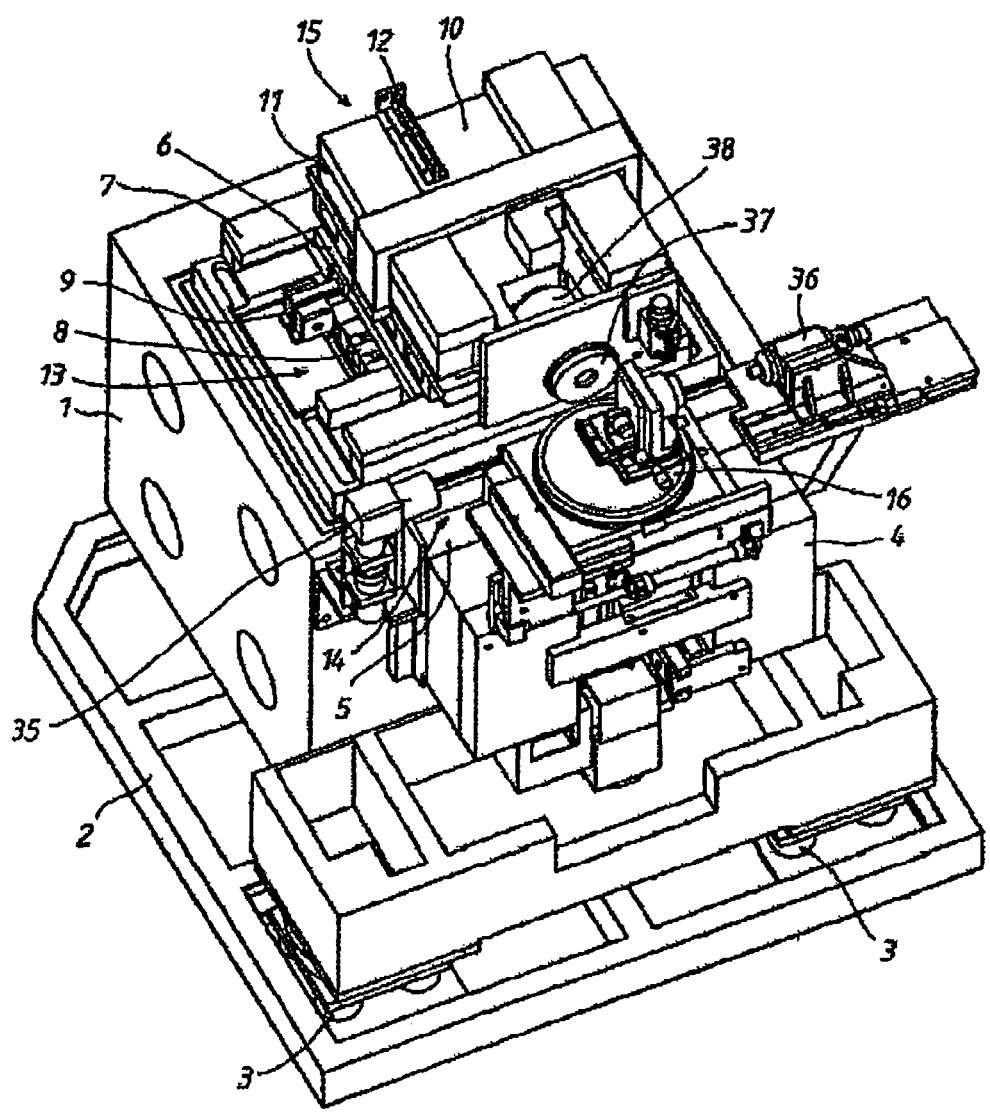
FIG. 2 is a whole oblique perspective view of the hale-machining apparatus according to the present invention.
Figure 3:
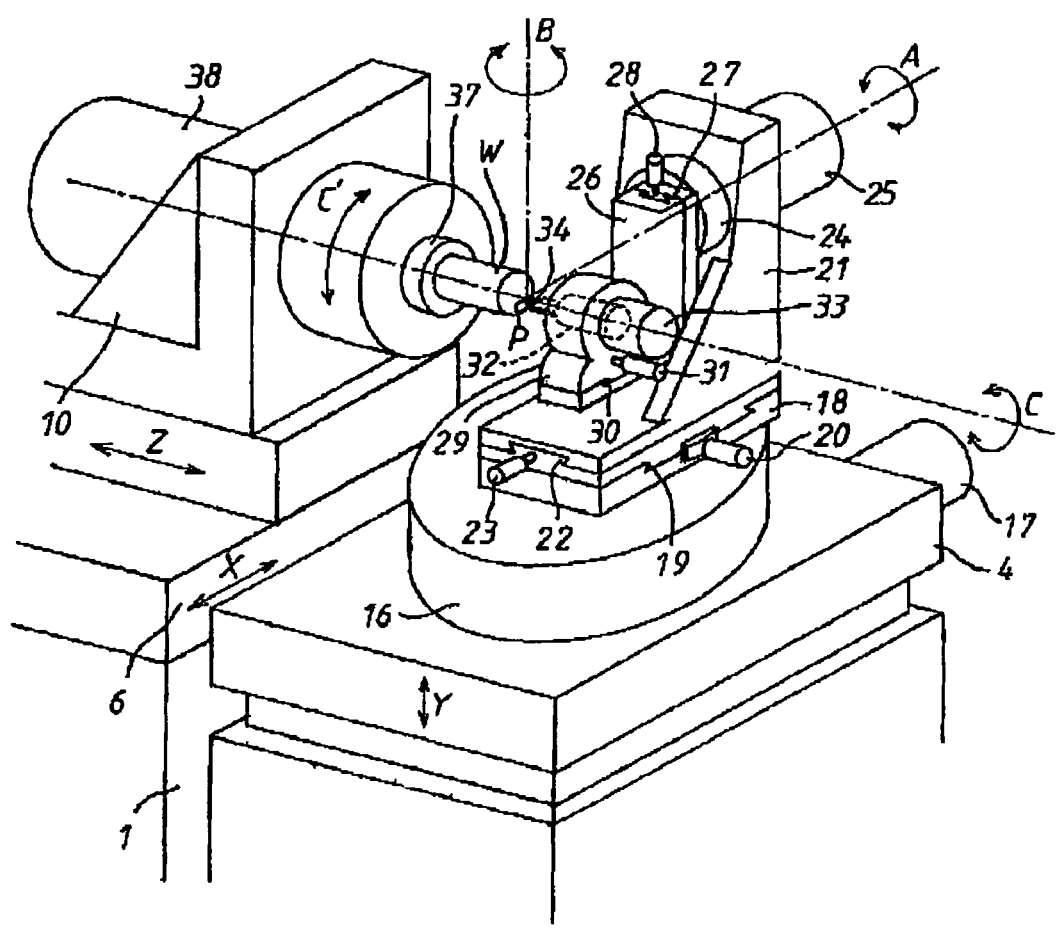
FIG. 3 is a partially enlarged oblique perspective view of the hale-machining apparatus according to the present invention.

A preferred embodiment of the hale-machining method and apparatus according to the present invention will be described referring to FIG. 2 to FIG. 3. In FIG. 2 and FIG. 3, a bed 1 is mounted on a base 2 through a vibration isolator 3. On a front surface of the bed 1 is provided a Y-axis slide table 4 straightly movable in up/down Y-axis direction by being guided with a guide mechanism 5. The Y-axis slide table 4 is straightly moved by an un-illustrated linear motor at the Y-axis direction and a position thereof is controlled by detecting a movement amount of the Y-axis slide table 4 by an un-illustrated linear scale as a feedback data. An X-axis slide table 6 is mounted on a horizontal surface of the bed 1 to be straightly movable in right/left X-axis direction by being guided with a guide mechanism 7. The X-axis slide table 6 is moved straightly by a linear motor 8 in the X-axis direction and a position thereof is controlled by detecting a movement amount of the X-axis slide table 6 by a linear scale 9 as a feedback data. On the X-axis slide table 6 a workpiece support table 10 is mounted to be straightly movable at front back Z-axis direction. The workpiece support table 10 is moved straightly by an un-illustrated linear motor in the Z-axis direction by being guided with a guide mechanism 11 and a position thereof is controlled by detecting a movement amount of the workpiece support table 10 by a linear scale 12 as a feedback data. As described above, the Y-axis slide table 4, the X-axis slide table 6 and the workpiece support table 10 are relatively and straightly moved in orthogonal three axes directions by an X-axis, a Y-axis and a Z-axis straight movement devices 13 to 15 each of which is constructed by the guide mechanisms 5, 7, 11, linear motors and linear scales, etc.

On the Y-axis slide table 4, a rotary table 16 is mounted rotatably around a B-axis which is a first rotating axis parallel to the Y-axis and rotated by a servo motor 17 which is a first rotary driving device. An adjusting slide 18 is guided by a guide mechanism 19 in a horizontal direction perpendicular to the B-axis and mounted to be adjustable in position by a fine position adjustment mechanism 20 on a top surface of the rotary table 16. An angle rest 21 is guided by a guide mechanism 22 in a horizontal direction perpendicular to a guide direction of the guide mechanism 19 and mounted to be adjustable in position by a fine position adjustment mechanism 23 on a top surface of the adjusting slide 18. A shape of the angle rest 21 is a letter L. A rotary base 24 is mounted on a vertical wall of the angle rest 21 rotatably around an A-axis, which is a second rotating axis parallel to a guide direction of the guide mechanism 22 perpendicular to the B-axis, and rotated by a servo motor 25 which is a second rotary driving device. An adjustment base 26 is guided by a guide mechanism 27 in a perpendicular direction to the A-axis and mounted to be adjustable in position by a fine position adjustment mechanism 28 on a top surface of the rotary base 24. A shape of the adjustment base 26 is a letter L. A tool base 29 is guided by a guide mechanism 30 in a perpendicular direction to the A-axis and a guide direction of the guide mechanism 27 and mounted to be adjustable in position by a fine position adjustment mechanism 31 on a mounting surface of the adjustment base 26. A tool holder 32 is mounted on the tool base 29 rotatably around a C-axis which is a third rotating axis in a parallel direction to a guide direction of the guide mechanism 30 and in a perpendicular direction to the A-axis, and rotated by a servo motor 33 which is a third rotary driving device.

The adjusting slide 18 guided by the guide mechanism 19 on the rotary table 16 is adjusted by the fine position adjustment mechanism 20 in the horizontal direction perpendicular to the A-axis. The angle rest 21 guided by the guide mechanism 22 on the adjusting slide 18 is adjusted by the fine position adjustment mechanism 23 in the horizontal direction parallel to the A-axis. And the adjustment base 26 guided by guide mechanism 27 through the rotary base 24 on the angle rest 21 is adjusted by the fine position adjustment mechanism 28 in the vertical direction to the A-axis. With these three adjusting processes, the C-axis is positioned at a point P intersected with the A-axis and the B-axis. These guide mechanisms 19, 22, 27 and 28 are constructed by a dovetail groove and so on, these fine position adjustment mechanism are constructed by a screw driving mechanism and so on.

A cutting point of a haling tool 34 is mounted on the tool holder 32 to be oriented approximately at the point P intersected with the A-axis, the B-axis and the C-axis. A numeral 35 is a light source emitting a parallel light and the light source 35 is fixed on the front surface of the bed 1 to emit the cutting point. A numeral 36 is a microscope to enlarge the cutting point emitted by the light source 35 and the microscope 36 is fixed on the bed 1 opposite to the light source 35 at the haling tool 34. The light emitted through the cutting point is reached to the microscope 36 through four unillustrated reflection mirrors, it can be arranged to mount the microscope 36 at the position of the light source 35 instead thereof to detect the cutting point by an outside light. Positions of the point P in a Y-Z plane are adjusted in such the way that the projected image of the point P is coincided with an intersection point of a horizontal reference line and a vertical reference line defined on a screen of the microscope 36 where the Y-axis slide table 4, the rotary table 16, the rotary base 24 and the tool holder 32 are positioned in original positions respectively and the A-axis, the X-axis are parallel to the C-axis, the Z-axis respectively. The Y-Z plane includes the Y-axis and the Z-axis. The haling tool 34 is mounted on the tool holder 32 in such a manner that at first the front rake surface of the haling tool 34 is parallel to the Y-Z plane and the parallel light from the light source 35 is emitted to the cutting point to make the image thereof on the screen of the microscope 36. Then, the Y-axis slide table 4 is moved by the linear motor along the Y-axis direction in order that a center of the front rake surface is substantially coincide with the horizontal reference line and then the position of the Y-axis slide table is set as machining original point. The tool base 29 guided by the guide mechanism 30 on the adjustment base 26 is adjusted by the fine position adjustment mechanism 31 along the C-axis direction in order that a top edge of the front rake surface is substantially coincide with the vertical reference line. Then, the haling tool 34 is adjusted along the X-axis direction in order that the image of the cutting point is in focus. Finally, the cutting point of the haling tool 34 is substantially coincided with the point P.

A numeral 37 is a workpiece spindle to be attached a workpiece W, and the spindle 37 is supported on the workpiece table 10 rotatably around a C'-axis which is a fourth rotating axis parallel to the -axis. The spindle 37 is rotated by a servo motor 38 which is a fourth driving device. A position of the spindle 37 along the Y-axis direction is substantially coincided with the horizontal reference line displayed on the screen of the microscope 36.

Next, the hale-machining method according to the present invention will be explained hereinafter with an operation of the above-described hale-machining apparatus. The haling tool 34 is mounted on the tool holder 32 in such a way that the cutting point is coincided with the intersection point P of the first, the second and the third rotating axes. In order to hale-machine the workpiece W by the haling tool 34 during the continuous rotation of the workpiece W an un-illustrated numerical controller controls next three dimensional straight movements and three rotational movements. The Y-axis slide table 4 is moved straightly by the straight movement device 14, the X-axis slide table 6 is moved straightly by the straight movement device 13 and the workpiece table 10 is moved straightly by the straight movement device 15. At this time in order to hale-machine the workpiece W in such a numerically controlled manner that the cutting point is moved along the predetermined three dimensional free curved surface, in addition to these three dimensional straight movements, the rotary table 16 is rotated by the servo motor 17 around the B-axis, the first rotating axis, the rotary base 24 is rotated by the servo motor 25 around the A-axis, the second axis, and the tool holder 32 is rotated by the servo motor 33 around the C-axis, the third axis. By the numerical control of three dimensional straight movements and three rotational movements, a direction of the tool axis of the haling tool 34 is always coincided with a normal direction of the predetermined three-dimensional free curved surface of the workpiece W and also the front rake surface of the haling tool 34 is always maintained in perpendicular to the cutting feed direction to maintain constantly in same cutting feed direction of the front rake surface in spite of the free curve in three dimension. Therefore, the attitude of the haling tool 34 is swung at the cutting point P up and down by maintaining the tool axis to the normal direction and right and left by maintaining the front rake surface at the perpendicular angle to the cutting feed direction so that a removable amount is precisely maintained in constant. On the result, the machined surface of the workpiece W can be machined by the haling tool 34 along the desired three-dimensional free curved surface to achieve a high geometrical accuracy in the predetermined three-dimensional free curved surface. It can be applicable to machine a fine groove on a three-dimensional free curved surface of the workpiece, too.

Where there is a plurality of machined portions circumferentially disposed on the workpiece W, each of which is machined into the same three-dimensional free curved surfaces respectively, the spindle 37 is indexed around the C'-axis, the fourth rotating axis, by the servo motor 38 without the continuous rotation to be indexed sequentially each of machined surface to a position that is faced to the haling tool 34. At this machining position, the same NC machining program is performed to hale-machine into the same three-dimensional free curved surface.

While the invention has been described in detail with reference to the preferred embodiment, it will be apparent to those skilled in the art that the invention is not limited to the present embodiment, and that the invention may be realized in various other embodiments within the scope of the claims.

What is claimed is:

1. A hale-machining method comprising the steps of:
    mounting a rotary table rotatably around a first rotating axis;
    mounting a rotary base on said rotary table rotatably around a second rotating axis perpendicular to said first axis;
    mounting a tool holder on said rotary base rotatably around a third rotating axis perpendicular to both of said first rotating axis and said second rotating axis;
    setting a haling tool on said tool holder in such a manner that a cutting point of said haling tool is substantially coincided with an intersection of said first rotating axis, said second rotating axis and said third rotating axis;
    straightly moving said tool holder and a workpiece table holding a workpiece relatively along a machined surface of said workpiece in three perpendicular axes including an axis parallel to said first rotating axis;
    rotating said rotary table and said rotary base in such a manner that a tool axis direction of said haling tool is substantially coincided with a normal direction of said machined surface; and
    rotating said tool holder in such a manner that a front rake surface of said haling tool is substantially directed in perpendicular to a feeding direction of said haling tool.

2. A hale-machining method according to claim 1, wherein said setting is performed by a fine position adjustment mechanism.

3. A hale-machining apparatus comprising:
    a rotary table mounted rotatably around a first rotating axis by a first rotary driving device;
    a rotary base mounted on said rotary table rotatably around a second rotating axis perpendicular to said first rotating axis by a second rotary driving device;
    a tool holder mounted on said rotary base rotatably around a third rotating axis perpendicular to said first rotating axis and said second rotating axis by a third rotary driving device;
    a haling tool set on said tool holder in such a manner that a cutting point of said haling tool is substantially coincided with an intersection of said first rotating axis, said second rotating axis and said third rotating axis;

three straight movement devices moving relatively said tool holder and a workpiece table along a machined surface of said workpiece in three perpendicular axes including an axis parallel to said first rotating axis; and control means for controlling said first rotary driving device, said second rotary driving device, said third rotary driving device and said three straight movement devices such that that said cutting point is moved along said desired machined surface, and such that said first and second rotary driving devices rotate said rotary table and said rotary base respectively in such a manner that a tool axis direction of said haling tool is substantially coincided with a normal direction of said machined surface, and said third rotary driving device rotates said tool holder in such a manner that a front rake surface of said haling tool is substantially directed perpendicular to a feeding direction of said haling tool.

4. A hale-machining apparatus according to claim 3, further comprising:

a fine position adjustment mechanism adjusting said rotary base and said tool holder to set said haling tool on said tool holder in said such manner that said cutting point of said haling tool is substantially coincided with said intersection of said first rotating axis, said second rotating axis and said third rotating axis.

5. A hale-machining apparatus according to claim 4, wherein said three straight movement devices including:

a Y-axis straight movement device moving straightly said Y-axis slide table on a bed along a Y-axis direction;

said Y-axis is parallel to said first rotating axis;

said rotary table is mounted on said Y-axis slide table rotatably around said first rotating axis; and a X-axis and a Z-axis straight movement devices moving straightly said workpiece table on said bed along a X-axis direction and a Z-axis direction respectively, said X-axis, said Y-axis and said Z-axis are constructed a three perpendicular axes.

6. A hale-machining apparatus according to any one of claim 3 to claim 5, further comprising:

a workpiece spindle mounted on said workpiece table rotatably by a fourth rotary driving apparatus around a fourth rotating axis perpendicular to said first rotating axis, said workpiece spindle holds said workpiece on the end thereof.

* * * * *